(12) United States Patent
Wada et al.

(10) Patent No.: US 8,749,221 B2
(45) Date of Patent: Jun. 10, 2014

(54) INPUT-OUTPUT CIRCUIT

(75) Inventors: Atsushi Wada, Ogaki (JP); Shigeto Kobayashi, Gifu-ken (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 173 days.

(21) Appl. No.: 13/436,406

(22) Filed: Mar. 30, 2012

(65) Prior Publication Data

US 2012/0249119 A1 Oct. 4, 2012

(30) Foreign Application Priority Data

Mar. 30, 2011 (JP) .................................. 2011-075990

(51) Int. Cl.
*G01N 27/00* (2006.01)
(52) U.S. Cl.
USPC ........................................................ 324/71.1
(58) Field of Classification Search
None
See application file for complete search history.

(56) References Cited

U.S. PATENT DOCUMENTS

| 8,129,978 | B2* | 3/2012 | Nakazato | 324/71.5 |
| 8,564,297 | B2* | 10/2013 | Burns et al. | 324/403 |
| 2008/0079415 | A1* | 4/2008 | Mirescu et al. | 324/76.11 |
| 2011/0260742 | A1* | 10/2011 | Sims et al. | 324/713 |
| 2012/0105051 | A1* | 5/2012 | Furtner | 324/123 R |

FOREIGN PATENT DOCUMENTS

JP 2010-205437 9/2010

* cited by examiner

*Primary Examiner* — Melissa Koval
*Assistant Examiner* — Trung Nguyen
(74) *Attorney, Agent, or Firm* — Polansky & Associates, PLLC; Paul J. Polansky (57) ABSTRACT

A power supply detecting circuit detects feeding of power to a power supply terminal from the outside. A control unit identifies an accessory device connected to the connector based on a detection result acquired by the identification terminal voltage detecting circuit and a detection result acquired by the power supply detecting circuit. The identification terminal voltage detecting circuit can narrow down accessory device candidates based on whether or not there is feeding of power detected by the power supply detecting circuit.

20 Claims, 9 Drawing Sheets

FIG.2

| ACCESSORY TABLE 1 ||||
| --- | --- | --- | --- |
| ACCESSORY DEVICE | $R_{ID}$ | VBUS | D+/D- Short D- High |
| ACCESSORY DEVICE 1 | 1M~ | PRESENT | NOT PRESENT |
| ACCESSORY DEVICE 2 | Rza+Rz | NOT PRESENT | NOT PRESENT |
| ACCESSORY DEVICE 3 | Rzb+Rz | PRESENT | NOT PRESENT |
| ACCESSORY DEVICE 4 | R1 | PRESENT | PRESENT |
| ACCESSORY DEVICE 5 | Ra | PRESENT | NOT PRESENT |
| ACCESSORY DEVICE 6 | Ra | NOT PRESENT | NOT PRESENT |
| ACCESSORY DEVICE 7 | Rzc+Rz | PRESENT | NOT PRESENT |
| ACCESSORY DEVICE 8 | Rzc+Rz | NOT PRESENT | NOT PRESENT |
| ACCESSORY DEVICE 9 | R2 | PRESENT | PRESENT |
| ACCESSORY DEVICE 10 | Rb | NOT PRESENT | NOT PRESENT |
| ACCESSORY DEVICE 11 | Rx | PRESENT | NOT PRESENT |
| ACCESSORY DEVICE 12 | Rc | NOT PRESENT | NOT PRESENT |
| ACCESSORY DEVICE 13 | Ry | PRESENT | NOT PRESENT |
| ACCESSORY DEVICE 14 | Rw | PRESENT | NOT PRESENT |
| ACCESSORY DEVICE 15 | Rd | NOT PRESENT | NOT PRESENT | th1 ↓ th1 (arrows pointing to Accessory Device 2 through Accessory Device 4)

FIG.3A

| ACCESSORY DEVICE | $R_{ID}$ | VBUS | D+/D-Short D- High |
|---|---|---|---|
| ACCESSORY DEVICE 2 | Rza+Rz | NOT PRESENT | NOT PRESENT |
| ACCESSORY DEVICE 6 | Ra | NOT PRESENT | NOT PRESENT |
| ACCESSORY DEVICE 8 | Rzc+Rz | NOT PRESENT | NOT PRESENT |
| ACCESSORY DEVICE 10 | Rb | NOT PRESENT | NOT PRESENT |
| ACCESSORY DEVICE 12 | Rc | NOT PRESENT | NOT PRESENT |
| ACCESSORY DEVICE 15 | Rd | NOT PRESENT | NOT PRESENT | th1 →

FIG.3B

| ACCESSORY DEVICE | $R_{ID}$ | VBUS | D+/D-Short D- High |
|---|---|---|---|
| ACCESSORY DEVICE 1 | 1M~ | PRESENT | NOT PRESENT |
| ACCESSORY DEVICE 3 | Rzb+Rz | PRESENT | NOT PRESENT |
| ACCESSORY DEVICE 5 | Ra | PRESENT | NOT PRESENT |
| ACCESSORY DEVICE 7 | Rzc+Rz | PRESENT | NOT PRESENT |
| ACCESSORY DEVICE 11 | Rx | PRESENT | NOT PRESENT |
| ACCESSORY DEVICE 13 | Ry | PRESENT | NOT PRESENT |
| ACCESSORY DEVICE 14 | Rw | PRESENT | NOT PRESENT |

FIG.3C

| ACCESSORY DEVICE | $R_{ID}$ | VBUS | D+/D-Short D- High |
|---|---|---|---|
| ACCESSORY DEVICE 4 | R1 | PRESENT | PRESENT |
| ACCESSORY DEVICE 9 | R2 | PRESENT | PRESENT |

FIG.4

| ACCESSORY TABLE 2 | | | |
|---|---|---|---|
| ACCESSORY DEVICE | $R_{ID}$ | VBUS | D+/D-Short D- High |
| ACCESSORY DEVICE 17 | Re | NOT PRESENT | NOT PRESENT |
| ACCESSORY DEVICE 18 | Rv | PRESENT | NOT PRESENT |
| ⋮ | ⋮ | ⋮ | ⋮ |
| ACCESSORY DEVICE n | Rf | NOT PRESENT | NOT PRESENT |

INPUT-OUTPUT CIRCUIT

This application is based upon and claims the benefit of priority from the prior Japanese Patent Application No. 2011-075990, filed on Mar. 30, 2011, the entire content is incorporated herein by reference.

BACKGROUND OF THE INVENTION

1. Field of the Invention

The present invention relates to an input-output circuit that is disposed between a connector and an internal circuit.

2. Description of the Related Art

Recently, smartphones have been rapidly come into wide use. In many smartphones, in order to improve the designability or decrease the circuit scale, a connector is attempted to be used in common. For example, models only having a micro-USB connector are also available in the market. In such models, in addition to power feeding and data communication, audio signals are transmitted or received through one micro-USB connector. Such connector sharing has been attempted also in other mobile devices such as a cellular phone, a small-sized PC, a digital camera, a portable music player, an IC recorder, and a game machine.

While there is such a trend of the connector sharing, the number of kinds of accessory devices connected to each mobile device has been increased every year. In order to accurately recognize a variety of accessory devices, it is necessary to precisely measure the resistance value of each accessory device, and thus a circuit for that purpose is required.

SUMMARY OF THE INVENTION

Recently, smartphones have been rapidly coming into wide use. In many smartphones, in order to improve the designability or decrease the circuit scale, a connector is attempted to be used in common. For example, models only having a micro-USB connector are also available in the market. In such models, in addition to power feeding and data communication, audio signals are transmitted or received through one micro-USB connector. Such connector sharing has been attempted also in other mobile devices such as a cellular phone, a small-sized PC, a digital camera, a portable music player, an IC recorder, and a game machine.

According to an aspect of the present invention, there is provided an input-output circuit that connects a connector including at least a power supply terminal and an identification terminal used for identifying a connected accessory device and an internal circuit to each other and includes: a power supply detecting circuit that detects feeding of power to the power supply terminal from the outside; and an identification terminal voltage detecting circuit that detects a voltage of the identification terminal. The identification terminal voltage detecting circuit identifies an accessory device connected to the connector by narrowing down accessory device candidates based on a detection result of the power supply detecting circuit and determining a voltage of the identification terminal.

According to another aspect of the present invention, there is provided an input-output circuit. This input-output circuit is an input-output circuit that connects a connector including at least an identification terminal that is used for identifying a connected accessory device and an internal circuit to each other and includes: a current source that supplies a current to the identification terminal; and an identification terminal voltage detecting circuit that identifies an accessory device connected to the connector by detecting the voltage of the identification terminal. The identification terminal voltage detecting circuit includes an analog-to-digital converter that is used for detecting an analog voltage of the identification terminal as a digital value. The identification terminal voltage detecting circuit appropriately increases or decreases the amount of the current flowing through the identification terminal when a digital value, which is output from the analog-to-digital converter, acquired by excluding a mode identification bit is a minimal value or a maximum value or a minimal value group or a maximum value group.

DETAILED DESCRIPTION OF THE INVENTION

The invention will now be described by reference to the preferred embodiments. This does not intend to limit the scope of the present invention, but to exemplify the invention.

First Embodiment

Figure 1:
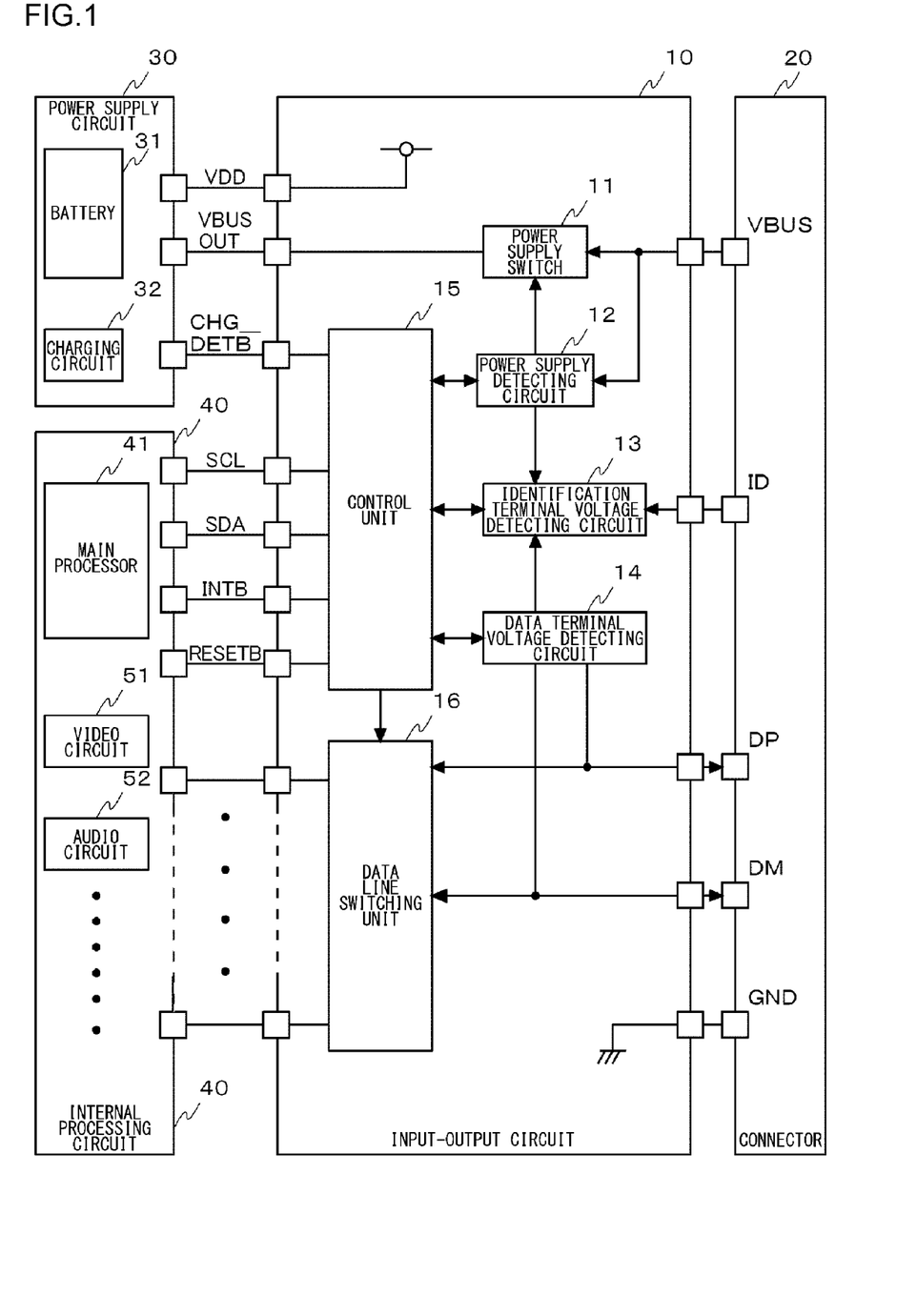
FIG. 1 is a diagram illustrating the configuration of an input-output circuit according to a first embodiment of the present invention.

FIG. 1 is a diagram illustrating the configuration of an input-output circuit 10 according to a first embodiment of the present invention. The input-output circuit 10 connects a connector 20 to a power supply circuit 30 and an internal processing circuit 40 as internal circuits. Hereinafter, in the description presented here, an example will be described in which the input-output circuit 10, the connector 20, the power supply circuit 30, and the internal processing circuit 40 are mounted in a smartphone. In addition, an example will be described in which a micro-USB connector is used as the connector 20. The micro-USB connector is configured by five terminals (pins) including a power supply terminal (VBUS), a ground terminal (GND), differential pair terminals (D+ and D−), and an identification line terminal (ID).

The power supply circuit 30 includes a battery 31 and a charging circuit 32. As the battery 31, a lithium ion battery or a nickel hydrogen battery is used. When a charger is connected to the connector 20, under the control of the charging circuit 32, power is charged in the battery 31 from the charger through a power supply path arranged inside the input-output circuit 10.

The internal processing circuit 40 includes a main processor 41, a video circuit 51, an audio circuit 52, and the other circuits. Examples of the other circuits include a physical layer chip (PHY) circuit, a universal asynchronous receiver transmitter (UART) circuit, and the like. The main processor 41 controls the overall operation of a terminal device (in this embodiment, a smartphone) in which the main processor is mounted. The main processor 41, the video circuit 51, the audio circuit 52, and the other circuits transmit and receive signals to and from a device (for example, a PC or a television set) or an accessory device (for example, a charger, an earphone, a headphone, or a microphone) that is connected to the connector 20 through the input-output circuit 10.

The input-output circuit 10 includes a power supply switch 11, a power supply detecting circuit 12, an identification terminal voltage detecting circuit 13, a data terminal voltage detecting circuit 14, a control unit 15, and a data line switching unit 16. The power of the input-output circuit 10 is basically supplied from the battery 31 through a VDD terminal. In addition, the power of the power supply detecting circuit 12 is supplied from the charger connected to the connector 20 through a VBUS terminal.

The power supply switch 11 is a switch that switches between conduction of power, which is supplied from the charger connected to the connector 20 through the VBUS terminal, to the battery 31 through a VBUSOUT terminal and blocking of the power. As the power supply switch 11, a power MOSFET or the like can be used. The switching of the power supply switch 11 is controlled by the power supply detecting circuit 12.

The power supply detecting circuit 12 detects the feeding of power to the VBUS terminal from the outside. In other words, the power supply detecting circuit 12 detects that a charger is connected to the connector 20. When the feeding of the power to the VBUS terminal from the outside is detected, the power supply detecting circuit 12 turns on the power supply switch 11 and notifies the control unit 15 of the detection of power. Alternatively, the power supply detecting circuit 12 may be designed so as to turn on the power supply switch 11 after a permission signal for turning on the power supply switch 11 is received from the control unit 15.

The identification terminal voltage detecting circuit 13 detects a voltage of an ID terminal and notifies the control unit 15 of the detected voltage. The accessory device has a unique resistance value corresponding to the accessory standard thereof. As will be described later, by arranging a current source that allows a current to flow at the ID terminal, the identification terminal voltage detecting circuit 13 detects the resistance value as a voltage. A detailed configuration example of the identification terminal voltage detecting circuit 13 will be described later.

The data terminal voltage detecting circuit 14 monitors and detects the voltages of the DP terminal and the DM terminal. More specifically, the data terminal voltage detecting circuit 14 detects the open, the pull-up, and the pull-down of at least one of the DP terminal and the DM terminal or formation of a short circuit between both the terminals. In addition, the data terminal voltage detecting circuit 14 can also detect the kind (a difference in the pull-up/pull-down resistance) of the pull-up/pull-down. The data terminal voltage detecting circuit 14 notifies the control unit 15 of the detection result.

The control unit 15 controls the overall operation of the input-output circuit 10. In this embodiment, an example will be described in which an I²C serial controller is used in the control unit 15. In such a case, the control unit 15 receives a clock signal from the internal processing circuit 40 through an I²C_SCL terminal. In addition, a data signal is transmitted and received between the control unit 15 and the internal processing circuit 40 through an I²C_SDA terminal. Furthermore, the control unit 15 supplies an interrupt signal to the internal processing circuit 40 through an INTB terminal. In addition, the control unit 15 receives a hardware reset signal from the internal processing circuit 40 through a RESETB terminal.

The control unit 15 supplies a charger detecting signal to the charging circuit 32 through a CHG_DETB terminal. In addition, the control unit 15 can supply control signals to the power supply detecting circuit 12, the identification terminal voltage detecting circuit 13, and the data terminal voltage detecting circuit 14.

The control unit 15 identifies an accessory device connected to the connector 20 based on the detection result acquired through the identification terminal voltage detecting circuit 13 and the detection result (more specifically, feeding or no-feeding) acquired through the power supply detecting circuit 12. In such a case, the control unit 15 may narrow down accessory device candidates based on whether or not there is power feeding.

In addition, the control unit 15 may identify the accessory device connected to the connector 20 based on the detection result acquired through the identification terminal voltage detecting circuit 13 and the detection result (more specifically, the states of the DP terminal and the DM terminal) acquired through the data terminal voltage detecting circuit 14. In such a case, the control unit 15 may narrow down the accessory device candidates based on the states of the DP terminal and the DM terminal.

Furthermore, the control unit 15 may identify the accessory device connected to the connector 20 based on the detection result acquired through the identification terminal voltage detecting circuit 13, the detection result acquired through the power supply detecting circuit 12, and the detection result acquired through the data terminal voltage detecting circuit 14. In such a case, the control unit 15 may narrow down the accessory device candidates based on whether or not there is power feeding and the states of the DP terminal and the DM terminal. In addition, the process of narrowing down the accessory devices and the identification process may be designed so as to be performed by the identification terminal voltage detecting circuit 13.

The data line switching unit 16 includes a plurality of switches and performs switching control of various signals that are transmitted and received between the internal processing circuit 40 and an external device through the DP terminal and the DM terminal. In addition, an internal configuration example of the data line switching unit 16 will be described in a second embodiment to be described later.

Figure 2:
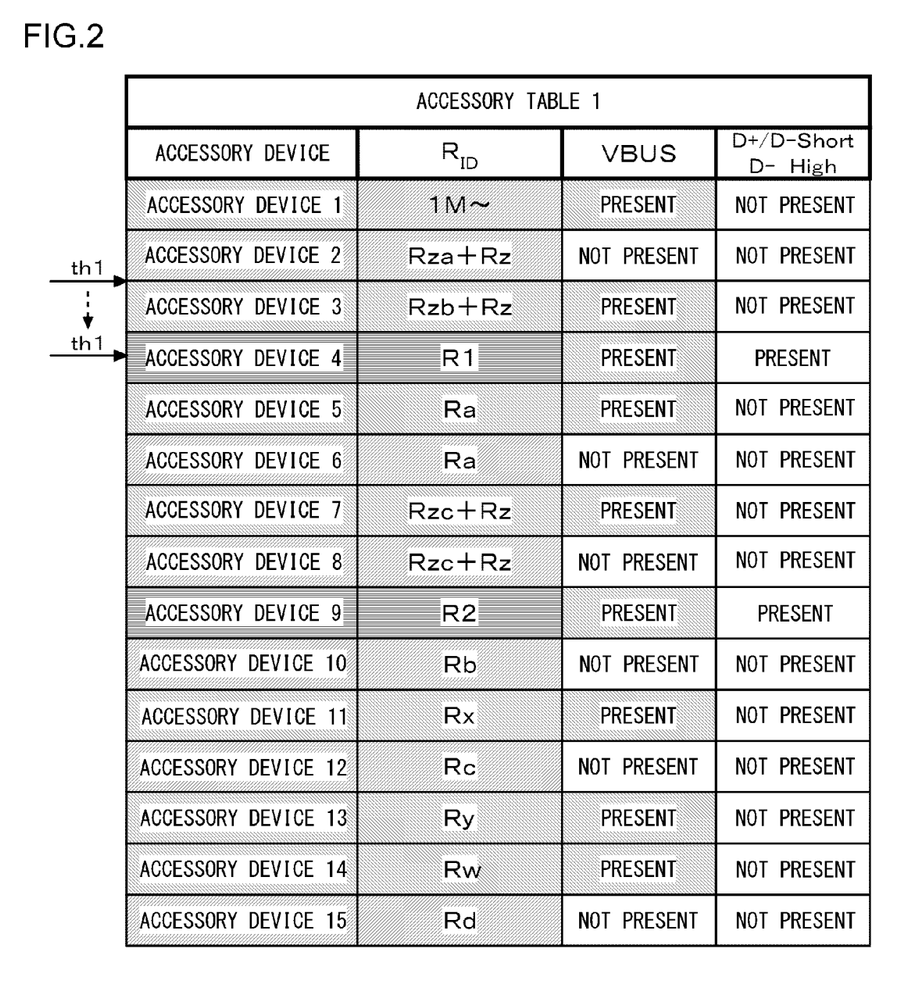
FIG. 2 is a diagram illustrating an example of Accessory Table 1.

FIG. 2 is a diagram illustrating an example of Accessory Table 1. Accessory Table 1 is managed by the control unit 15. In Accessory Table 1 illustrated in FIG. 2, 15 kinds of accessory devices 1 to 15 are registered. In addition, the resistance $R_{ID}$ of each of the accessory devices 1 to 15, power feeding or no-power feeding from the VBUS terminal, and whether or not there is formation of a short circuit between the DP terminal and the DM terminal or whether of not the high level of the DM terminal are described.

Here, the formation of a short circuit between the DP terminal and the DM terminal or the high level of the DM terminal represents a parameter that is used for specifying whether or not a charger defined by a standard such as a USB-IF (BCS) or the like is connected. Ina state in which power is fed from the VBUS terminal, in a case where the DP terminal and the DM terminal are short-circuited or the DM terminal is at the high level, the accessory device can be determined as a charger defined by the standard such as the USB-IF (BCS).

In Accessory Table 1 illustrated in FIG. 2, the resistance value defined as the resistance $R_{ID}$ is lowered toward the lower side from the upper side. The topmost accessory device 1 of which the resistance $R_{ID}$ is defined to be 1 MΩ or more is an extension (device) that is defined by the USB-OTG (On-the-Go) standard. In addition, although not illustrated in the figure, the resistance $R_{ID}$ of a base unit (host) corresponds to 0Ω.

An accessory device of which the resistance $R_{ID}$ is represented by a polynomial such as "Rza+Rz" (accessory device 2) is an accessory device that has a plurality of operation modes. For example, there is an earphone to which a sending/receiving switch is attached. In a music listening mode (or a phone call mode), the value of the resistance $R_{ID}$ is Rza+Rz, and, at the time of notification (call receiving/call ending) used for switching between the phone call mode and the music listening mode, the value of the resistance $R_{ID}$ is Rz.

As illustrated in FIG. 2, there are accessory devices having a variety of resistances $R_{ID}$ in the market, and thus a configuration is necessary in which all the accessory devices can be accurately identified so as to prevent an erroneous detection. In order to accurately identify all the accessory devices, generally, an analog-to-digital converter (hereinafter, referred to as an ADC) with high precision is required. However, in a case where an ADC having high precision is used, the power consumption and the circuit scale are increased.

Thus, in this embodiment, the accessory devices are classified into three groups based on the conditions including whether or not power is fed from the VBUS terminal, and whether or not there is formation of a short circuit between the DP terminal and the DM terminal or whether or not the DM terminal is at the high level. In FIG. 2, accessory devices shaded with diagonal lines inclined toward the lower left side are devices belonging to a group (hereinafter, referred to as Group 1) in which there is no power fed from the VBUS terminal. In addition, accessory devices shaded with diagonal lines inclined toward the lower right side are devices belonging to a group (hereinafter, referred to as Group 2) in which there is power fed from the VBUS terminal, and there is no formation of a short circuit between the DP terminal and the DM terminal or high level of the DM terminal. Accessory devices shaded with horizontal lines are devices belonging to a group (hereinafter, referred to as Group 3) in which there is power fed from the VBUS terminal, and there is formation of a short circuit between the DP terminal and the DM terminal or the high level of the DM terminal.

Figure 3A:
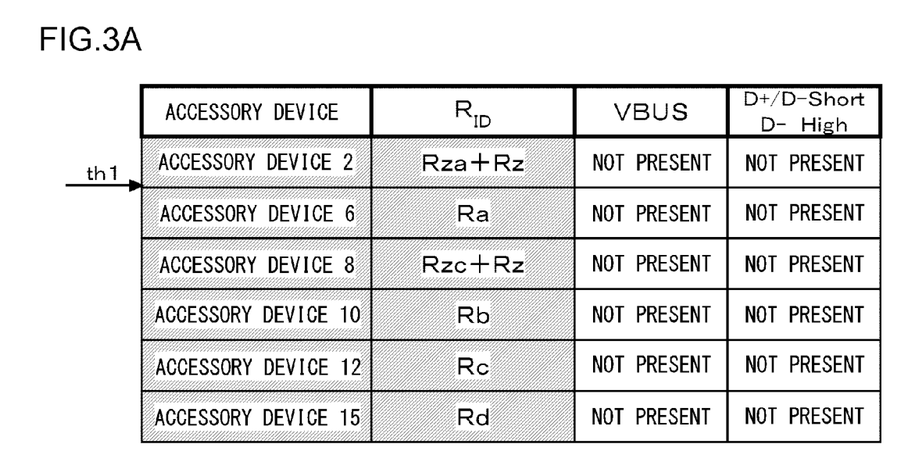
FIGS. 3A to 3C are diagrams illustrating accessory tables after the classification of Accessory Table 1 illustrated in FIG. 2.
Figure 3B:
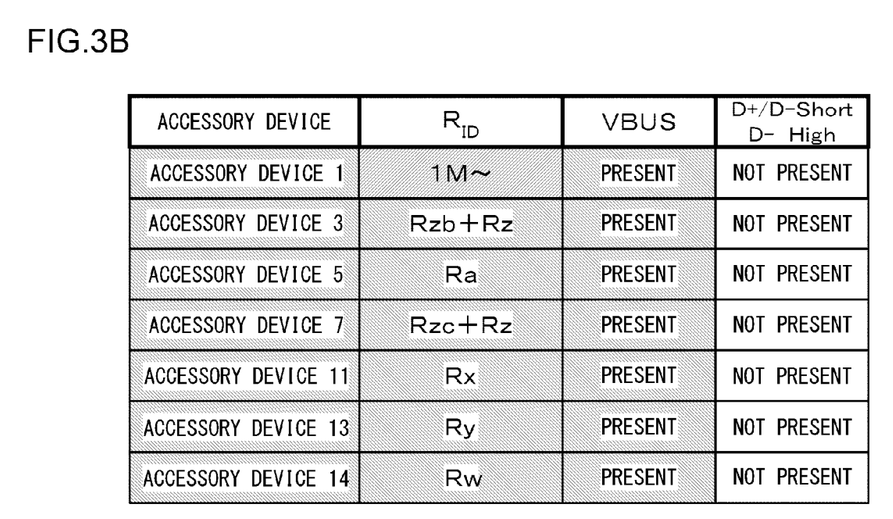
Figure 3C:
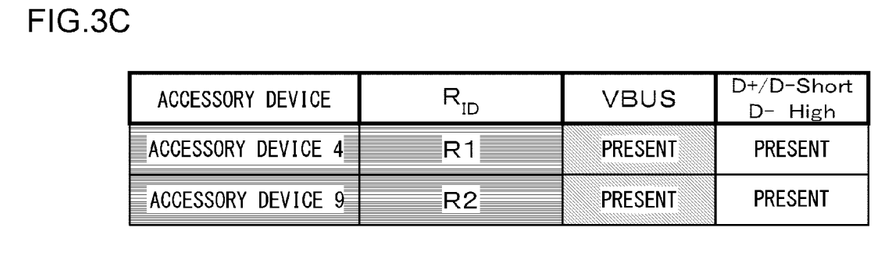

FIGS. 3A to 3C are diagrams illustrating accessory tables after the classification of Accessory Table 1 illustrated in FIG. 2. FIG. 3A illustrates an accessory table of Group 1, FIG. 3B illustrates an accessory table of Group 2, and FIG. 3C illustrates an accessory table of Group 3. For identifying the resistance $R_{ID}$ after the classification, compared to a case where the resistance $R_{ID}$ before the classification is identified, a relatively low-specification ADC is sufficient. In other words, the number of elements such as comparators and resistors that are included in the ADC can be decreased, whereby the power consumption and the circuit scale can be reduced. In addition, variations in the current flowing through the ID terminal, which will be described later, can be suppressed, whereby the design restriction for high precision is alleviated.

Furthermore, by classifying the accessory devices, the level of the boundary used for distinguishing the accessory devices can be changed, whereby there is a margin when a boundary determination is made. Hereinafter, a specific example will be described. In order to distinguish the accessory device 2 (resistance of Rza+Rz) and the accessory device 3 (resistance of Rzb+Rz) from each other, it is necessary to arrange a boundary threshold value th1 between the resistance Rza+Rz and the resistance Rzb+Rz (see FIG. 2). Here, when the resistance Rza+Rz is set to 797 kΩ, and the resistance Rzb+Rz is set to 557 kΩ, it is necessary to arrange the threshold value th1 between 797 kΩ and 557 kΩ.

However, in consideration of a variation in the accessory resistance, a variation in the current (which will be described later with reference to FIGS. 5 and 6) flowing through the ID terminal, a variation in a reference voltage (which will be described later with reference to FIGS. 5 and 6) of the ADC, and the like, an erroneous determination may be easily made in the determination using the above-described threshold value th1.

As illustrated in FIG. 3A, in Group 1 after the classification, the resistance Rza+Rz and the resistance Ra may be configured to be distinguishable from each other. When the resistance Ra is 390 Ω, the boundary threshold value th1 may be arranged between 797 kΩ and 390 kΩ. As above, by moving the boundary threshold value th1, the design accuracy required for the determination can be alleviated (the determination precision is improved). Although the description has been presented only for Group 1, a similar discussion is also applicable to Group 2 and Group 3. In addition, in the example illustrated in FIG. 2 and FIGS. 3A to 3C, the accessory devices are classified into three groups based on two conditions including whether or not power is fed from the VBUS terminal, and whether or not there is formation of a short circuit between the DP terminal and the DM terminal or whether or not the DM terminal is at the high level. This classification is only an example. For example, the accessory devices may be classified into two groups based only on whether or not power is fed from the VBUS terminal, and alternatively two groups based only on whether or not there is formation of a short circuit between the DP terminal and the DM terminal or whether or not the DM terminal is at the high level.

Figure 4:
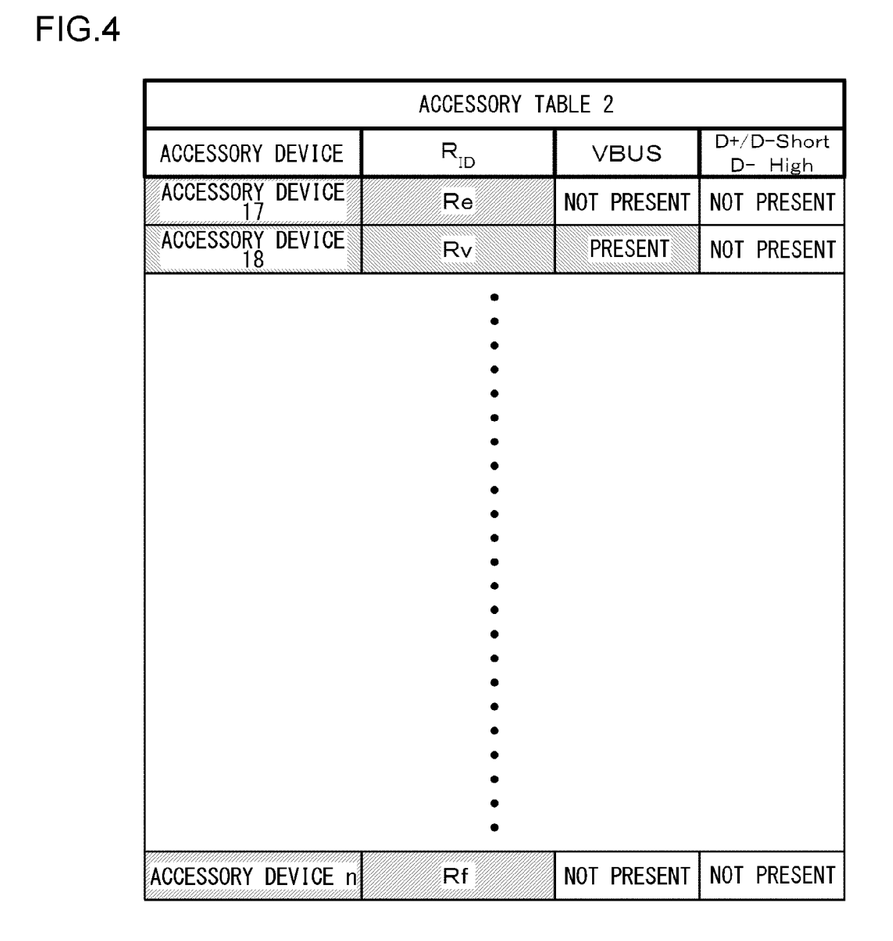
FIG. 4 is a diagram illustrating an example of Accessory Table 2.

FIG. 4 is a diagram illustrating an example of Accessory Table 2. Here, Accessory Table 2 is also managed by the control unit 15. As described above, while there are various accessory devices in the market, it is predicted that the number of kinds of accessory devices is further increased in the future. In addition, there are accessory devices, which are unique to each company, not corresponding to the standards. In a case where a new accessory device is added between resistance values defined in Accessory Table 1, the resistance $R_{ID}$ becomes dense so as to decrease the determination precision. In addition, the circuit scale needs to be increased. Accordingly, the accessory devices are managed based on Accessory Table 2 other than Accessory Table 1. In addition, while a method of identifying the accessory device registered in Accessory Table 2 will be described later with reference to FIG. 6, the range of resistance that is lower than that defined in Accessory Table 1 can be effectively used.

Figure 5:
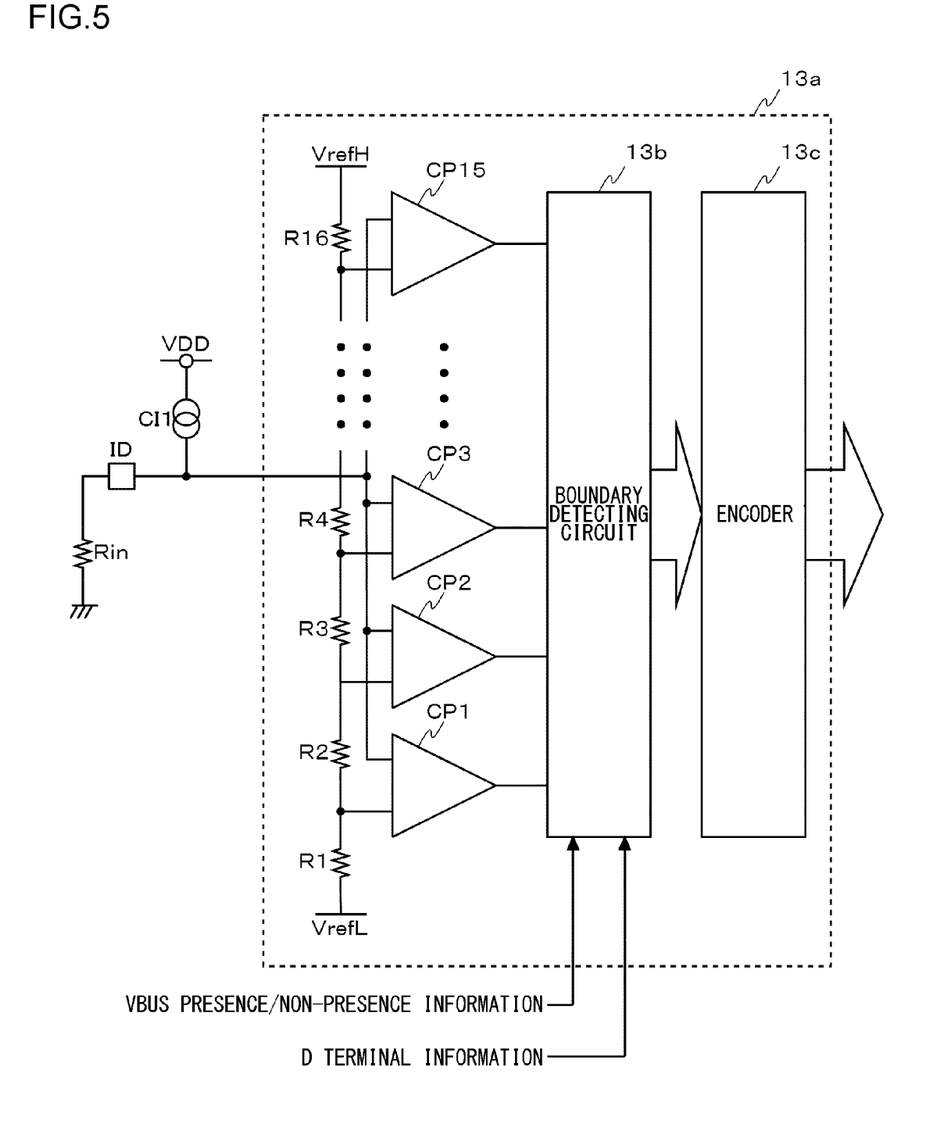
FIG. 5 is a diagram illustrating Configuration Example 1 of an identification terminal voltage detecting circuit.

FIG. 5 is a diagram illustrating Configuration Example 1 of the identification terminal voltage detecting circuit 13. In Configuration Example 1, the identification terminal voltage detecting circuit 13 is configured by an ADC 13a. A first constant current source CI1 used for supplying a reference current to the ID terminal is disposed between the ID terminal and the power supply voltage VDD. The first constant current source CI1, for example, can be configured by a transistor having the gate terminal to which a bias electric potential is applied. A resistor connected between the ID terminal and the ground illustrated in FIG. 5 illustrates the accessory resistor Rin of the accessory device that is connected to the connector 20.

The ADC 13a includes a resistor ladder, a plurality of comparators, a boundary detecting circuit 13b, and an encoder 13c and detects an analog voltage of the ID terminal as a digital value. In FIG. 5, an example of a flash-type ADC is drawn in which 15 comparators CP1 to CP15 are arranged to be in parallel with each other. In other words, a configuration is formed which can identify 16 kinds of accessory devices.

The resistor ladder is configured by a serial circuit of 16 resistors R1 to R16 and is disposed between a high electric potential-side reference voltage source VrefH and a low electric potential-side reference voltage source VrefL. The resistors R1 to R16 generate 15 kinds of voltages between the high electric potential-side reference voltage source VrefH and the low electric potential-side reference voltage source VrefL properly, and inputs the generated voltages to 15 comparators CP1 to CP15 as reference voltages.

The voltage of the ID terminal is input to the 15 comparators CP1 to CP15 in addition to the reference voltages. The voltage of the ID terminal is represented as the product of a reference current that is supplied from the first constant current source CI1 and the accessory resistance Rin. Each one of the comparators CP1 to CP15 compares the input reference voltage and the voltage of the ID terminal with each other and outputs the comparison result (a high level or a low level) to the boundary detecting circuit 13b. The comparators CP1 to CP15 output the comparison results as thermometer codes. In other words, the comparators output determination results in which all the outputs of comparators that are on the low electric potential side of the voltage of the ID terminal as a boundary are in the high level, and all the outputs of comparators that are on the high electric potential side thereof are in the low level.

Information indicating whether or not there is power fed from the VBUS terminal and information indicating whether or not there is formation of a short circuit between the DP terminal and the DM terminal or a high level of the DM terminal are input to the boundary detecting circuit 13b from the control unit 15.

Accordingly, the boundary detecting circuit 13b can recognize a group to which a detected accessory device belongs out of groups 1 to 3. The boundary detecting circuit 13b handles the output of a comparator that is used for detecting an accessory device that does not belong to a detection target as an invalid output in the boundary detection. Alternatively, it may be configured such that a boundary detecting circuit is prepared in each group, and detection is performed using only the outputs of comparators that are necessary.

In order to implement this, when the boundary detecting circuit 13b is built by logic circuits, the outputs of comparators used for boundary detection and the outputs of comparators not used for boundary detection may be respectively determined to be at the high level or the low level in advance for each group based on Accessory Table 1. For example, in a case where the comparators CP1 and CP3 are comparators used for boundary detection, and the comparator CP2 is a comparator not used for boundary detection, when the outputs of the comparators CP1 and CP3 are different from each other, the output of the comparator CP2 is determined to be at the high level or the low level in advance. Accordingly, the determination precision is improved, which has already been described.

The boundary detecting circuit 13b outputs the thermometer code after the boundary determination to the encoder 13c.

The encoder 13c converts the thermometer code input from the boundary detecting circuit 13b into a binary code and outputs the binary code to the control unit 15. In the example illustrated in FIG. 5, a 4-bit binary code is output.

By describing a voltage acquired by calculating the product of the resistance $R_{ID}$ and the reference current for each accessory device in advance in Accessory Table 1, the accessory device is identified. Alternatively, the accessory device may be identified by calculating the accessory resistance Rin by dividing the voltage value represented as the binary code by the reference current using the control unit 15 and comparing the accessory resistance with the resistance $R_{ID}$ included in Accessory Table 1.

Figure 6:
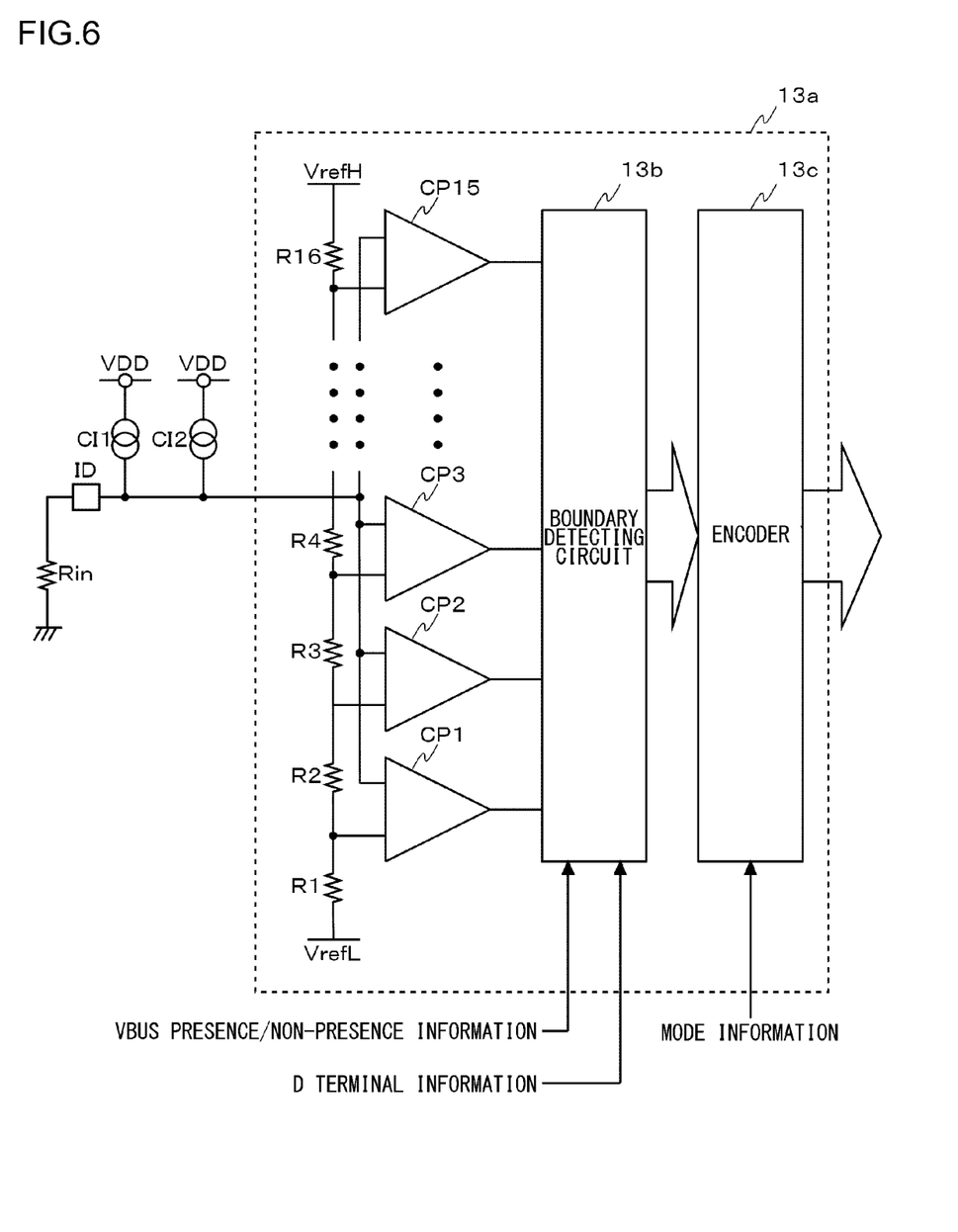
FIG. 6 is a diagram illustrating Configuration Example 2 of an identification terminal voltage detecting circuit.

FIG. 6 is a diagram illustrating Configuration Example 2 of the identification terminal voltage detecting circuit 13. Also in Configuration Example 2, similarly to Configuration Example 1, the identification terminal voltage detecting circuit 13 is configured by an ADC 13a. In Configuration Example 2, a first constant current source CI1 and a second constant current source CI2 are disposed between the ID terminal and the power supply voltage VDD. The second constant current source CI2 may be configured by a transistor having the gate terminal to which a bias electric potential is applied. For example, a current that is allowed to flow by the first constant current source CI1 is set to 1 µA, and a current that is allowed to flow by the second constant current source CI2 is set to 40 µA.

In Configuration Example 2, not only the accessory devices registered in Accessory Table 1 but also the accessory devices registered in Accessory Table 2 can be identified. In Configuration Example 2, when a digital value output from the ADC 13a is a minimum value or a maximum value (or a minimum value group that is a threshold value set in advance or less or a maximum value group that is similarly set) except for a mode identification bit, the control unit 15 increases the amount of the current flowing through the ID terminal. Accordingly, a transition can be made from the detection of accessory devices registered in Accessory Table 1 to the detection of accessory devices registered in Accessory Table 2.

The configuration of a resistor ladder, comparators CP1 to CP15, and a boundary detecting circuit 13b in Configuration Example 2 is similar to that in Configuration Example 1. In Configuration Example 2, the configuration of an encoder 13c is different from that of Configuration Example 1. Although the encoder 13c handles 4-bit data in the range of $(1111)_2$ to $(0000)_2$ in Configuration Example 1, the encoder 13c handles 5-bit data in the range of $(11111)_2$ to $(00000)_2$ in Configuration Example 2.

Mode information is input from the control unit 15 to the encoder 13c in Configuration Example 2. The mode information is information that indicates a detection mode (hereinafter, referred to as a normal mode) of Accessory Table 1 or a detection mode (hereinafter, referred to as a special mode) of Accessory Table 2. The encoder 13c reflects the mode information on a most significant bit. For example, the most significant bit is set to $(1)_2$ at the time of the normal mode, and the most significant bit is set to $(0)_2$ at the time of the special mode. Here, although an identification method performed through a read substitution of Table 1 for Table 2 using the mode information has been described, in a case where the accessory resistance Rin is calculated by dividing a voltage value represented as the binary code by the reference current using the control unit 15, the accessory device may be identified by comparing the accessory resistance Rin with the resistance $R_{ID}$ included in Accessory Table 1 and Accessory Table 2.

In the normal mode, the control unit 15 operates the first constant current source CI1 and stops the second constant current source CI2. When a digital value output from the encoder 13c is $(10000)_2$, the control unit 15 makes a transition from the normal mode to the special mode. When the encoder 13c outputs $(10000)_2$, it represents that there is a possibility that the connected accessory device is not registered in Accessory Table 1.

In order to make a transition to the special mode, the control unit 15 operates the constant current source CI2 and notifies the encoder 13c of the transition to the special mode. In addition, the operation of the first constant current source CI1 may be continued or stopped. As above, by appropriately increasing the current flowing through the ID terminal, an accessory device having further low accessory resistance can be detected without changing the resistor ladder and the comparators CP1 to CP15. Accordingly, 16 or more kinds of accessory devices can be detected using 15 comparators. In addition, by further increasing the number of constant current sources, the number of special modes can be increased, whereby the number of accessory devices that can be identified can be further increased. The mode converting process may be designed to be performed by the identification terminal voltage detecting circuit 13.

As described above, according to the first embodiment, not only the information acquired from the ID terminal but also power feeding or non-power feeding and/or the state of the data terminal are considered, and accordingly, the kind of the connected accessory device can be accurately recognized while suppressing an increase in the circuit scale and power consumption. In other words, by classifying the accessory devices, the precision of the boundary determination can be improved. In addition, by arranging the special mode, many kinds of accessory devices can be identified while suppressing an increase in the circuit scale and the power consumption. Furthermore, the number of special modes can be increased so as to have high expandability.

Second Embodiment

Figure 7:
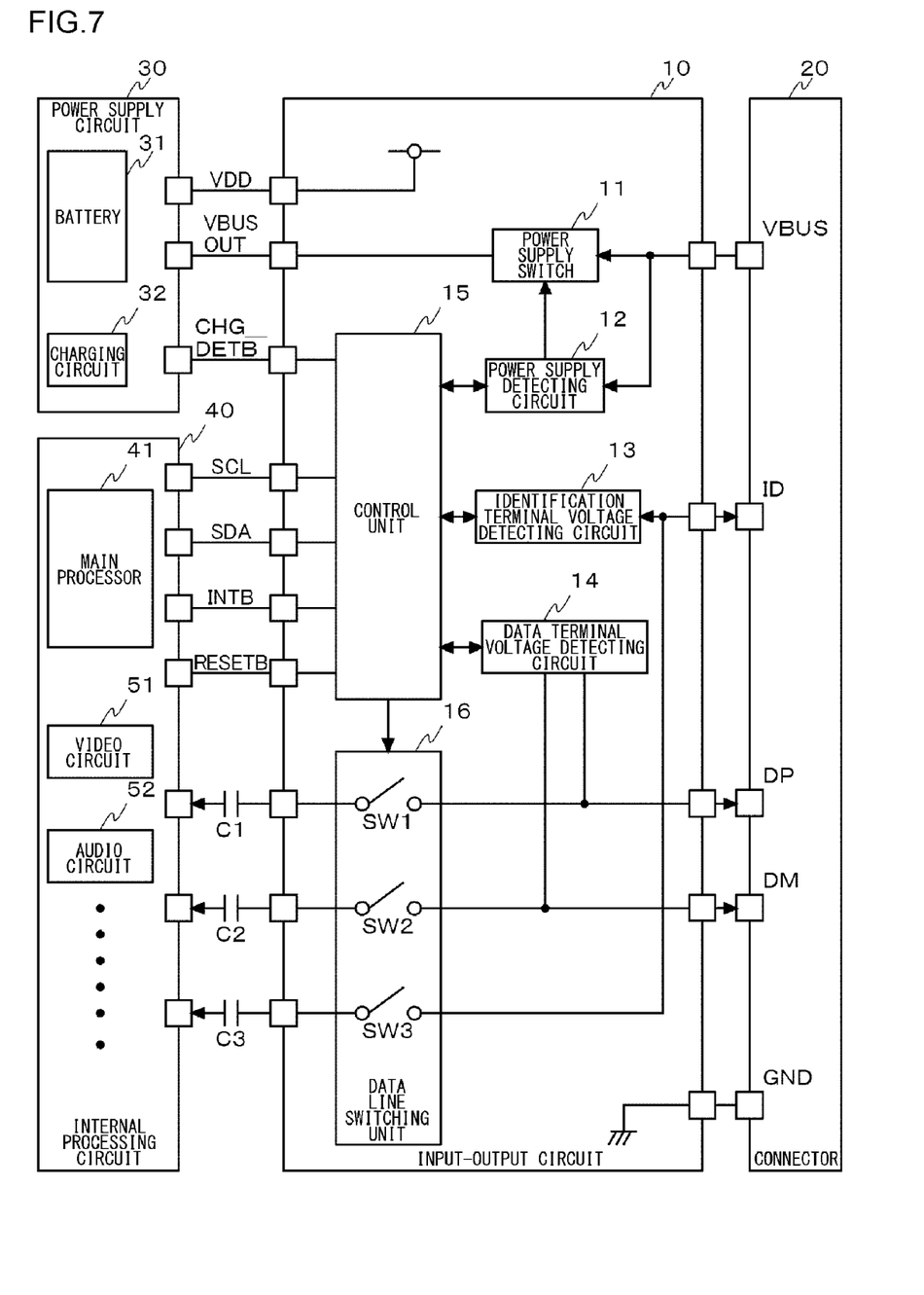
FIG. 7 is a diagram illustrating the configuration of an input-output circuit according to a second embodiment of the present invention.

FIG. 7 is a diagram illustrating the configuration of an input-output circuit 10 according to a second embodiment of the present invention. The basic configuration and the basic operation of the input-output circuit 10 illustrated in FIG. 7 are similar to those of the input-output circuit 10 illustrated in FIG. 1. In the second embodiment, a use state is considered in which a moving image is externally output to an external display device (for example, a TV set or a PC) through the input-output circuit 10 and the connector 20.

More particularly, a state will be considered in which one end of a video cable is connected to the connector 20, and the other end thereof is connected to the external display device. In addition, it is premised that one signal line used for transmitting a video signal and two signal lines used for transmitting stereo audio signals are included in the video cable. In the state, through the video cable, a video signal is transmitted to the external display device from a video circuit 51, and the stereo audio signals are transmitted to the external display device from an audio circuit 52. The external display device reproduces a moving image and a stereo audio based on the video signal and the stereo audio signals received through the video cable.

In order to transmit the video signal and the stereo audio signals, three signal lines are necessary. As described above, in a case where a micro-USB connector is used as the connector 20, there are only five terminals including the VBUS terminal, the ID terminal, the DP terminal, the DM terminal, and the GND terminal, and, among them, the VBUS terminal and the GND terminal (particularly, during power feeding), are difficult to use for signal transmission, and accordingly, terminals that can be practically used for signal transmission are the ID terminal, the DP terminal, and the DM terminal. Thus, in this embodiment, the video circuit 51 transmits a video signal through the ID terminal, and the audio circuit 52 transmits stereo audio signals through the DP terminal and the DM terminal.

As illustrated in FIG. 7, the data line switching unit 16 includes a first switch SW1, a second switch SW2, and a third switch SW3. The first switch SW1 and the second switch SW2 are inserted into two signal lines used for transmitting the stereo audio signals. One ends of the two signal lines are connected to the DP terminal and the DM terminal, respectively, and the other ends thereof are connected to the audio circuit 52 disposed within the internal processing circuit 40 through a first capacitor C1 and a second capacitor C2. The first capacitor C1 and the second capacitor C2 cut DC components of the stereo audio signals that are output by the audio circuit 52.

The third switch SW3 is inserted into the signal line used for transmitting a video signal. One end of the signal line is connected to the ID terminal, and the other end thereof is connected to the video circuit 51 disposed within the internal processing circuit 40 through the third capacitor C3. The third capacitor C3 cuts a DC component of a video signal that is output by the video circuit 51.

Hereinafter, a method of detecting a video cable as an accessory device using the identification terminal voltage detecting circuit 13 and the control unit 15 will be described. In the description presented below, the accessory resistance of the video cable as an accessory device is assumed to be 390 kΩ, and the terminating resistance viewed from the input-output circuit 10 in a state in which the video cable is terminated at the external display device is assumed to be 75Ω. In addition, it is premised that the accessory resistance and the terminating resistance are registered in Accessory Table 1 or Accessory Table 2 described above.

When the video cable is connected to the connector 20, there are a case where the other end of the video cable is connected to the external display device and a case where the other end of the video cable is not connected to the external display device. This occurs based on whether an end user first inserts the video cable into a video transmission-side device (for example, a smartphone) or first inserts the video cable into a video reception-side device (for example, a TV set).

First, a case (hereinafter, referred to as plug-in 1) will be described in which, first, the video cable is connected to the connector 20 and then is connected to the external display device. When a voltage (in this embodiment, a voltage corresponding to 390 kΩ) representing that the video cable is connected to the connector 20 is detected by the identification terminal voltage detecting circuit 13, and then a voltage (in this embodiment, a voltage corresponding to 75Ω) representing that the video cable is terminated by specified impedance is detected, the control unit 15 turns on the third switch SW3. Accordingly, a state is formed in which a video signal can be transmitted through the ID terminal.

Next, a case (hereinafter, referred to as plug-out) will be described in which the video cable is plugged out from the connector 20 or the external display device when a video signal is transmitted through the ID terminal in the state in which the third switch SW3 is turned on. As described above, currents are supplied from the first constant current source CI1 and/or the second constant current source CI2 to the ID terminal, and the third capacitor C3 is inserted between the ID terminal and the video circuit 51, and thus, when the plug-out occurs, the voltage of the ID terminal increases. Accordingly, by monitoring the voltage of the ID terminal, the occurrence of plug-out can be detected.

In other words, when the voltage of the ID terminal that is detected by the identification terminal voltage detecting circuit 13 is higher than a set voltage, the control unit 15 turns off the third switch SW3. A time until the reach of the voltage up to the set voltage is determined by the amounts of the currents flowing from the first constant current source CI1 and/or the second constant current source CI2 to the ID terminal and the capacitance of the ID terminal including the third capacitor. In addition, the control unit 15 may be configured to turn on the third switch SW3 and increase the amount of the current flowing through the ID terminal. For example, a transition may be made from the normal mode to the special mode described above. In such a case, the rising speed of the voltage of the ID terminal at the time of the occurrence of plug-out can be raised, whereby a time required for recognizing the plug-out can be shortened.

Figure 8:
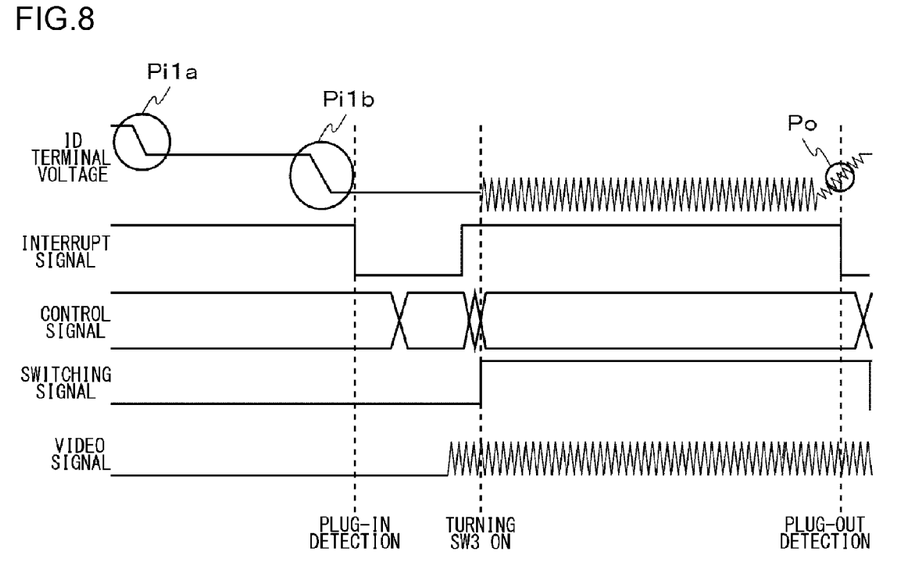
FIG. 8 is a diagram illustrating an example of an operation sequence of the input-output circuit at the time of the occurrence of plug-in 1 and plug-out.

FIG. 8 is a diagram illustrating an example of the operation sequence of the input-output circuit 10 at the time of the occurrence of plug-in 1 and plug-out. First, when the voltage of the ID terminal is detected to be the voltage corresponding to 390 kΩ by the identification terminal voltage detecting circuit 13 (see Pi1a), the control unit 15 recognizes that the video cable is connected to the connector 20 in this step. However, in this step, the third switch SW3 is not turned on. The reason for this is that the video cable is not terminated in this step, and, the amplitude of the video signal is twice that of a case where the video cable is terminated when the third switch SW3 is turned on.

Thereafter, when the voltage of the ID terminal is detected to be the voltage corresponding to 75Ω by the identification terminal voltage detecting circuit 13 (see Pi1b), the control unit 15 recognizes that the video cable connected to the connector 20 is terminated in this step. The control unit 15 outputs an interrupt signal to the main processor 41 through the INTB terminal and then outputs a plug-in detecting signal to the main processor 41 through an SDA terminal.

The main processor 41 outputs a signal instructing an external output of the video signal to the video circuit 51. The video circuit 51 starts to perform the external output of the video signal. When the external output of the video signal is started, the main processor 41 outputs a signal permitting to turn on the video switch to the control unit 15 through the SDA terminal. When this signal is received, the control unit 15 changes the switching signal used for the third switch SW3 to the high level so as to turn on the third switch SW3. Accordingly, the video signal is output to the external display device through the video cable.

When the voltage of the ID terminal is detected to be the set voltage by the identification terminal voltage detecting circuit 13 (see Po), the control unit 15 recognizes the occurrence of plug-out. The control unit 15 outputs an interrupt signal to the main processor 41 through the INTB terminal, and then outputs a plug-out detecting signal to the main processor 41 through the SDA terminal and changes the switching signal to the low level so as to turn off the third switch SW3.

Although not illustrated in the figure, the operations of the audio circuit 52, the first switch SW1, and the second switch SW2 may be associated with the operations of the video circuit 51 and the third switch SW3.

Next, a case (hereinafter, referred to as plug-in 2) will be described in which the video cable is connected to the external display device first and then is connected to the connector 20. The control unit 15 needs to detect a voltage representing that the video cable terminated with specified impedance (in this embodiment, 75Ω) is connected to the connector 20 using the identification terminal voltage detecting circuit 13. In such a case, it may be configured such that the impedance is not identified in the normal mode, a transition to the above-described special mode (or a further-expanded special mode) is made, then 75Ω is identified, and the third switch SW3 is turned on. In such a case, a state is formed in which a video signal can be transmitted through the ID terminal. Here, the process of plug-out is a process similar to that of the case of plug-in 1.

Figure 9:
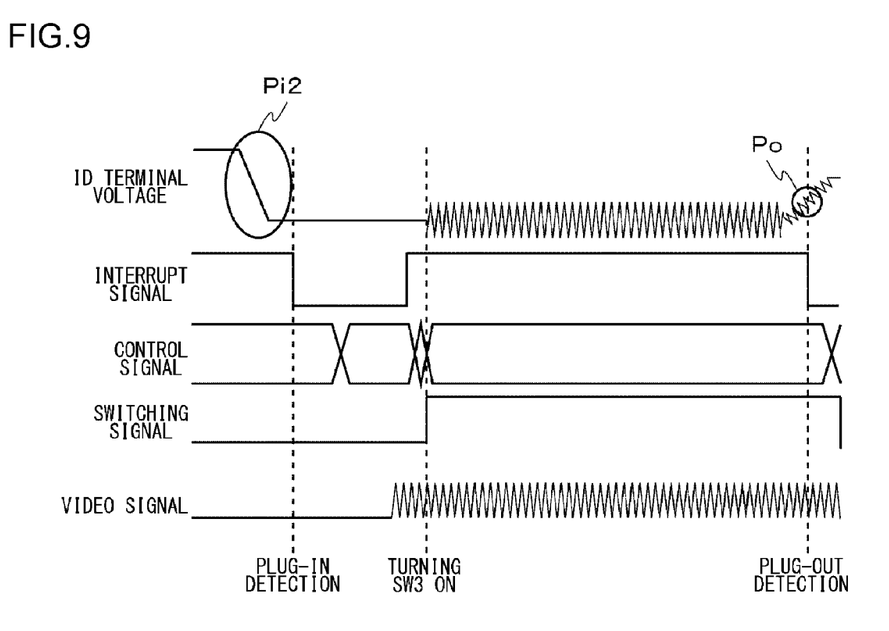
FIG. 9 is a diagram illustrating an example of an operation sequence of the input-output circuit at the time of the occurrence of plug-in 2 and plug-out.

FIG. 9 is a diagram illustrating an example of the operation sequence of the input-output circuit 10 at the time of the occurrence of plug-in 2 and plug-out. First, when the voltage of the ID terminal is detected to be the voltage corresponding to 75Ω by the identification terminal voltage detecting circuit 13 (Pi2), the control unit 15 recognizes that the video cable terminated with 75Ω is connected to the connector 20. Thereafter, the control unit 15 outputs an interrupt signal to the main processor 41 through the INTB terminal and then outputs a plug-in detecting signal to the main processor 41 through the SDA terminal. The sequence after that is similar to the sequence illustrated in FIG. 8.

As described above, according to the second embodiment, by monitoring the voltage of the ID terminal, it can be accurately detected whether there is a video cable connected to the connector 20, and the external output of a video signal can be accurately controlled. In addition, with the use of the above-described special mode, the detection timing of plug-out can be brought forward.

As above, the present invention has been described based on the embodiments. However, the embodiments are merely examples, and it is understood by those skilled in the art that various modified examples can be made in a combination of the constituent elements or the processes, and such modified examples are also within the scope of the present invention.

For example, in the first embodiment, although an example has been described in which the resistance $R_{ID}$ of the accessory device registered in Accessory Table 2 is lower than the resistance $R_{ID}$ of the accessory device registered in Accessory Table 1, a reverse case may be employed. In such a case, when the digital value output from the encoder 13c is $(11111)_2$, the control unit 15 changes the mode and decreases the current flowing through the ID terminal.

For example, in the second embodiment, an example has been described in which a display device is assumed to be the external device connected through the video cable and a video signal is output to the outside. In this point, the technique according to the second embodiment can be similarly applied also to a case where an imaging device or a video storage device is assumed to be the external device and image data is acquired inside from the device through the video cable. In addition, the above-described plug-out detecting process can be also applied to a circuit in which a plug-in detecting process other than the plug-in 1 detecting process and the plug-in 2 detecting process is employed.

What is claimed is:

1. An input-output circuit that connects a connector including at least a power supply terminal and an identification terminal used for identifying a connected accessory device of a first number of accessory devices and an internal circuit to each other, the input-output circuit comprising:

a power supply detecting circuit that detects feeding of power to the power supply terminal from the outside; and an identification terminal voltage detecting circuit that detects a voltage of the identification terminal, wherein the identification terminal voltage detecting circuit identifies an accessory device connected to the connector by narrowing down accessory device candidates based on a detection result of the power supply detecting circuit and determining the voltage of the identification terminal from a second number of voltages, the second number less than the first number.

2. The input-output circuit according to claim 1, wherein the identification terminal voltage detecting circuit narrows down the accessory device candidates based on whether or not there is feeding of power that is detected by the power supply detecting circuit.

3. The input-output circuit according to claim 1, further comprising a data terminal voltage detecting circuit that detects voltages of a first data terminal and a second terminal, wherein
the connector further includes the first data terminal and the second data terminal that are data terminals of a differential pair, and
the identification terminal voltage detecting circuit identifies the accessory device by determining the voltage of the identification terminal based on at least one of detection results of the power supply detecting circuit and the data terminal voltage detecting circuit.

4. The input-output circuit according to claim 3, wherein the identification terminal voltage detecting circuit identifies the accessory device by narrowing down the accessory device candidates based on whether or not there is power feeding detected by the power supply detecting circuit and states of the first data terminal and the second data terminal that are detected by the data terminal voltage detecting circuit and determining the voltage of the identification terminal.

5. The input-output circuit according to claim 3, wherein the identification terminal voltage detecting circuit comprises:
a resistor ladder comprising a plurality of resistors coupled in series between a first reference voltage source and a second reference voltage source;
a plurality of comparators each having a first terminal coupled to the identification terminal, a second terminal coupled to an interconnection point between a corresponding pair of the plurality of resistors of the resistor ladder, and an output; and
a boundary detecting circuit for providing an output in response to selected outputs of the plurality of comparators based on the voltages of the first data terminal and the second data terminal.

6. The input-output circuit according to claim 5, wherein the identification terminal voltage detecting circuit further comprises:
an encoder for encoding the output of the boundary detecting circuit.

7. The input-output circuit according to claim 1, further comprising:
a current source that supplies a current to the identification terminal, wherein
the identification terminal voltage detecting circuit includes an analog-to-digital converter that is used for detecting an analog voltage of the identification terminal as a digital value, and the identification terminal voltage detecting circuit increases an amount of the current flowing through the identification terminal when the digital value, which is output from the analog-to-digital converter, acquired by excluding a mode identification bit is a minimal value or a minimal group.

8. The input-output circuit according to claim 1, wherein the identification terminal voltage detecting circuit comprises:
a resistor ladder comprising a plurality of resistors coupled in series between a first reference voltage source and a second reference voltage source;
a plurality of comparators each having a first terminal coupled to the identification terminal, a second terminal coupled to an interconnection point between a corresponding pair of the plurality of resistors of the resistor ladder, and an output; and
a boundary detecting circuit for providing an output in response to selected outputs of the plurality of comparators based on the detection result of the power supply detecting circuit.

9. The input-output circuit according to claim 8, wherein the identification terminal voltage detecting circuit further comprises:
an encoder for encoding the output of the boundary detecting circuit.

10. An input-output circuit that connects a connector including at least an identification terminal that is used for identifying a connected accessory device of a first number of accessory devices and an internal circuit to each other, the input-output circuit comprising:
a current source that supplies a current to the identification terminal; and
an identification terminal voltage detecting circuit that identifies an accessory device connected to the connector by detecting a voltage of the identification terminal, wherein
the identification terminal voltage detecting circuit includes an analog-to-digital converter that is used for detecting an analog voltage of the identification terminal as a digital value, and
the identification terminal voltage detecting circuit increases an amount of the current flowing through the identification terminal when the digital value, which is output from the analog-to-digital converter, acquired by excluding a mode identification bit is a minimal value or a minimal group.

11. The input-output circuit according to claim 10, further comprising:
a power supply detecting circuit that detects feeding of power to a power supply terminal from the outside,
wherein the identification terminal voltage detecting circuit identifies the connected accessory device by narrowing down accessory device candidates based on a detection result of the power supply detecting circuit and determining the voltage of the identification terminal from a second number of voltages, the second number less than the first number.

12. The input-output circuit according to claim 11, further comprising:
a resistor ladder comprising a plurality of resistors coupled in series between a first reference voltage source and a second reference voltage source;
a plurality of comparators each having a first terminal coupled to the identification terminal, a second terminal coupled to an interconnection point between a corresponding pair of the plurality of resistors of the resistor ladder, and an output; and
a boundary detecting circuit for providing an output in response to selected outputs of the plurality of comparators based on the detection result of the power supply detecting circuit.

13. The input-output circuit according to claim 12, wherein the identification terminal voltage detecting circuit further comprises:
an encoder for encoding the output of the boundary detecting circuit.

14. The input-output circuit according to claim 10, further comprising:
a data terminal voltage detecting circuit that detects voltages of a first data terminal and a second data terminal,
wherein the identification terminal voltage detecting circuit identifies the connected accessory device by narrowing down accessory device candidates based on states of the first data terminal and the second data terminal that are detected by the data terminal voltage detecting circuit and determining the voltage of the identification terminal from a second number of voltages, the second number less than the first number.

15. The input-output circuit according to claim 14, further comprising:
a resistor ladder comprising a plurality of resistors coupled in series between a first reference voltage source and a second reference voltage source;
a plurality of comparators each having a first terminal coupled to the identification terminal, a second terminal coupled to an interconnection point between a corresponding pair of the plurality of resistors of the resistor ladder, and an output; and
a boundary detecting circuit for providing an output in response to selected outputs of the plurality of comparators based on the voltages of the first data terminal and the second data terminal.

16. The input-output circuit according to claim 15, wherein the identification terminal voltage detecting circuit further comprises:
an encoder for encoding the output of the boundary detecting circuit.

17. The input-output circuit of claim 10 wherein:
the identification terminal voltage detecting circuit increases the amount of the current flowing through the identification terminal by selectively switching a second current source that supplies a second current to the identification terminal.

18. An input-output circuit that connects a connector including at least a power supply terminal, a first data terminal and a second data terminal that are data terminals of a differential pair, and an identification terminal used for identifying a connected accessory device of a first number of accessory devices and an internal circuit to each other, the input-output circuit comprising:
a data terminal voltage detecting circuit that detects voltages of the first data terminal and the second data terminal; and
an identification terminal voltage detecting circuit that detects a voltage of the identification terminal, wherein
the identification terminal voltage detecting circuit identifies the connected accessory device by narrowing down accessory device candidates based on states of the first data terminal and the second data terminal that are detected by the data terminal voltage detecting circuit and determining the voltage of the identification terminal from a second number of voltages, the second number less than the first number.

19. The input-output circuit according to claim 18, wherein the identification terminal voltage detecting circuit comprises:
a resistor ladder comprising a plurality of resistors coupled in series between a first reference voltage source and a second reference voltage source;
a plurality of comparators each having a first terminal coupled to the identification terminal, a second terminal coupled to an interconnection point between a corresponding pair of the plurality of resistors of the resistor ladder, and an output; and
a boundary detecting circuit for providing an output in response to selected outputs of the plurality of comparators based on the voltages of the first data terminal and the second data terminal.

20. The input-output circuit according to claim 19, wherein the identification terminal voltage detecting circuit further comprises:
an encoder for encoding the output of the boundary detecting circuit.

* * * * *

UNITED STATES PATENT AND TRADEMARK OFFICE
CERTIFICATE OF CORRECTION

| | | |
|---|---|---|
| PATENT NO. | : 8,749,221 B2 | Page 1 of 1 |
| APPLICATION NO. | : 13/436406 | |
| DATED | : June 10, 2014 | |
| INVENTOR(S) | : Atsushi Wada et al. | |

It is certified that error appears in the above-identified patent and that said Letters Patent is hereby corrected as shown below:

In the Specification

Column 1, line 14, replace "come" with "coming".

Column 1, delete the paragraph beginning at line 35 and ending at line 45.

In the Claims

Column 13, line 15, (claim 3, line 3) replace "second terminal," with "second data terminal,".

Signed and Sealed this
Sixteenth Day of September, 2014

Michelle K. Lee
*Deputy Director of the United States Patent and Trademark Office*